(12) United States Patent
Acar et al.

(10) Patent No.: US 10,169,508 B2
(45) Date of Patent: **\*Jan. 1, 2019**

(54) EFFICIENT DEPLOYMENT OF TABLE LOOKUP (TLU) IN AN ENTERPRISE-LEVEL SCALABLE CIRCUIT SIMULATION ARCHITECTURE

(71) Applicant: International Business Machines Corporation, Armonk, NY (US)

(72) Inventors: Emrah Acar, Yorktown Heights, NY (US); Rajiv V. Joshi, Yorktown Heights, NY (US); Tong Li, Yorktown Heights, NY (US)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/827,217

(22) Filed: Nov. 30, 2017

(65) Prior Publication Data

US 2018/0081998 A1    Mar. 22, 2018

Related U.S. Application Data

(63) Continuation of application No. 15/452,908, filed on Mar. 8, 2017, now Pat. No. 9,928,327, which is a continuation of application No. 14/994,630, filed on Jan. 13, 2016, now Pat. No. 9,600,615, which is a continuation of application No. 14/170,126, filed on Jan. 31, 2014, now Pat. No. 9,256,704.

(51) Int. Cl.
*G06F 17/50* (2006.01)
*G06F 17/30* (2006.01)

(52) U.S. Cl.
CPC .... *G06F 17/5036* (2013.01); *G06F 17/30952* (2013.01); *G06F 17/504* (2013.01); *G06F 17/5045* (2013.01); *G06F 2217/12* (2013.01)

(58) Field of Classification Search
CPC .............. G06F 17/5009; G06F 17/504; G06F 17/5045; G06F 17/5022; G06F 17/5036; G06F 17/30952
USPC ........................................................ 716/106
See application file for complete search history.

(56) References Cited

U.S. PATENT DOCUMENTS 5,418,974 A    5/1995  Craft
6,618,846 B2   9/2003  Cheng
(Continued)

OTHER PUBLICATIONS

Office Action in U.S. Appl. No. 15/452,908 dated Apr. 21, 2017.
(Continued)

*Primary Examiner* — Paul Dinh
(74) *Attorney, Agent, or Firm* — Rabin Bhattacharya, Esq.; McGinn IP Law Group, PLLC

(57) ABSTRACT

A method for conducting numerical analysis includes defining a plurality of components in a system and a condition to be statistically analyzed, performing a table look-up for individual components of the plurality of components, acquiring a result for the condition to be statistically analyzed based on information in a table when a component of the plurality of components is defined in the table, and designing a circuit from integrated circuits based on conducting the statistical analysis of the system. The designing the circuit from the integrated circuits is implemented in manufacturing the integrated circuits.

20 Claims, 9 Drawing Sheets

(56) References Cited

U.S. PATENT DOCUMENTS

| | | |
|---|---|---|
| 6,973,622 B1 | 12/2005 | Rappaport et al. |
| 7,444,604 B2 | 10/2008 | Croix et al. |
| 7,620,929 B1 | 11/2009 | Jang et al. |
| 8,201,114 B1 | 6/2012 | Manohararajah |
| 8,312,404 B2 | 11/2012 | Hu et al. |
| 9,594,858 B1 | 3/2017 | Tseng |
| 2003/0182639 A1 | 9/2003 | Lehner |
| 2005/0114821 A1 | 5/2005 | Petunin et al. |
| 2005/0273298 A1 | 12/2005 | Shah |
| 2007/0078638 A1 | 4/2007 | McDonald et al. |
| 2008/0022225 A1 | 1/2008 | Erl |
| 2008/0243414 A1 | 10/2008 | Oh |
| 2009/0119085 A1 | 5/2009 | Ma et al. |
| 2010/0076736 A1 | 3/2010 | Shimizu |
| 2010/0192117 A1 | 7/2010 | Zhu et al. |
| 2010/0242007 A1 | 9/2010 | Yoda |
| 2010/0250187 A1* | 9/2010 | Zuber ................ G06F 17/5036 702/179 |
| 2010/0262413 A1 | 10/2010 | Acar et al. |
| 2010/0281448 A1 | 11/2010 | He |
| 2011/0213587 A1 | 9/2011 | Lu |
| 2012/0278117 A1 | 11/2012 | Nguyen et al. |
| 2012/0290281 A1 | 11/2012 | Joshi et al. |
| 2013/0305201 A1* | 11/2013 | Korobkov ........... G06F 17/5036 716/108 |
| 2014/0012881 A1 | 1/2014 | Roesch |
| 2014/0032201 A1 | 1/2014 | McCombs |
| 2014/0132772 A1 | 5/2014 | Billau |
| 2014/0142903 A1 | 5/2014 | Gullapalli et al. |
| 2014/0201132 A1 | 7/2014 | Konik |
| 2014/0279842 A1 | 9/2014 | Zhai et al. |
| 2015/0100984 A1 | 4/2015 | Hsiung et al. |
| 2016/0140272 A1 | 5/2016 | Mohan |

OTHER PUBLICATIONS

Office Action in U.S. Appl. No. 15/452,908 dated Aug. 11, 2017.
Notice of Allowance in U.S. Appl. No. 15/452,908 dated Nov. 14, 2017.
Office Action in U.S. Appl. No. 14/994,630 dated Apr. 22, 2016.
Office Action in U.S. Appl. No. 14/994,630 dated Aug. 3, 2016.
Notice of Allowance in U.S. Appl. No. 14/994,630 dated Nov. 7, 2016.
U.S. Office Action dated Jun. 6, 2015 in co-pending U.S. Appl. No. 14/170,126.
U.S. Notice of Allowance dated Oct. 5, 2015 in co-pending U.S. Appl. No. 14/170,126.
United States Office Action dated Apr. 21, 2016 in U.S. Appl. No. 14/994,658.
United States Office Action dated Aug. 3, 2016 in U.S. Appl. No. 14/994,658.
United States Office Action dated Aug. 10, 2017 in U.S. Appl. No. 15/452,913.
United States Office Action dated May 30, 2018 in U.S. Appl. No. 15/827,232.

\* cited by examiner

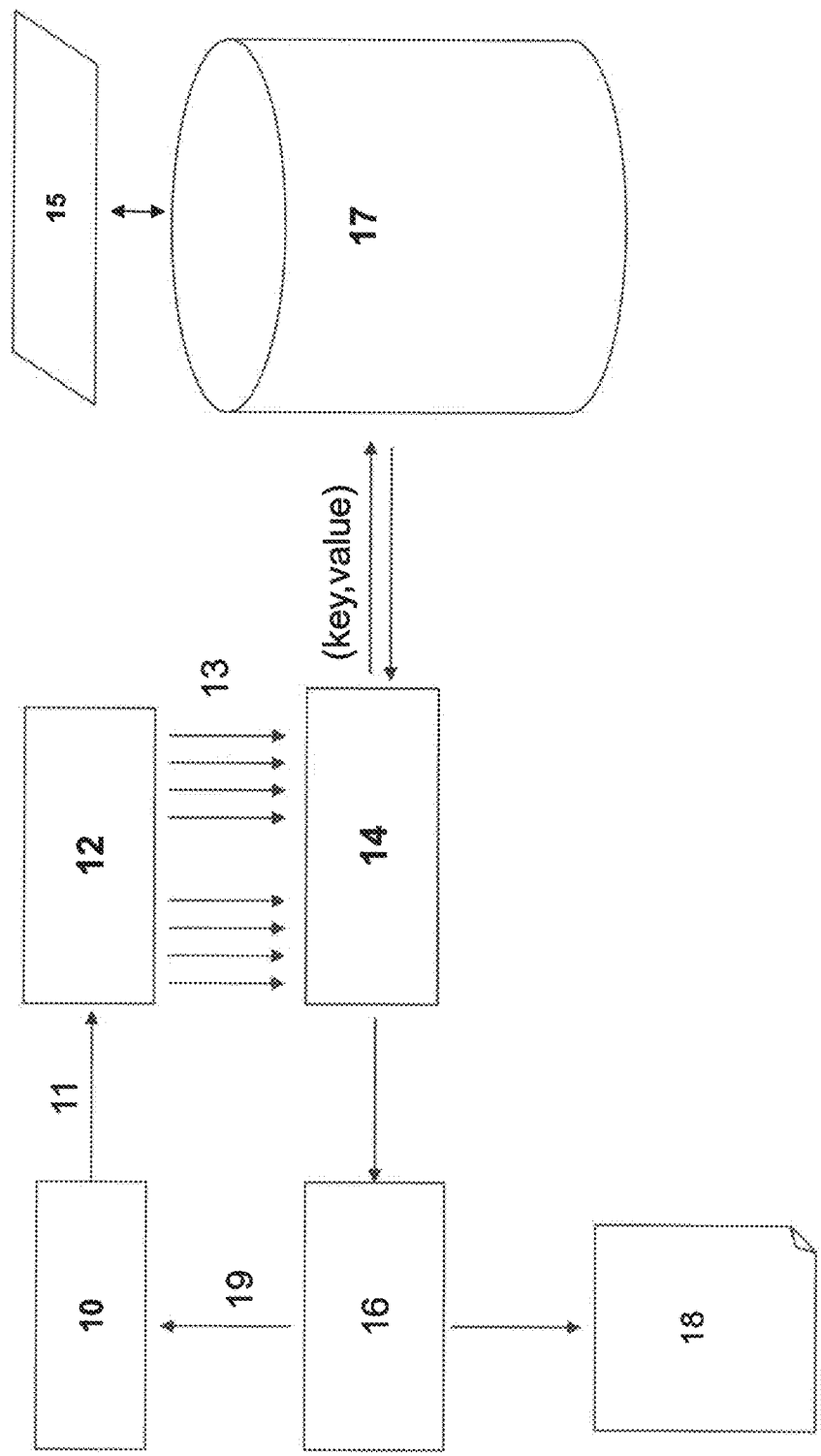

EFFICIENT DEPLOYMENT OF TABLE LOOKUP (TLU) IN AN ENTERPRISE-LEVEL SCALABLE CIRCUIT SIMULATION ARCHITECTURE

The present application is a Continuation Application of U.S. patent application Ser. No. 15/452,908, filed on Mar. 8, 2017, now U.S. Pat. No. 9,928,327, issued on Mar. 27, 2018, which is a Continuation Application of U.S. patent application Ser. No. 14/994,630, filed on Jan. 13, 2016, now U.S. Pat. No. 9,600,615, issued on Mar. 21, 2017, which is a Continuation Application of U.S. patent application Ser. No. 14/170,126, filed on Jan. 31, 2014, now U.S. Pat. No. 9,256,704, issued on Feb. 9, 2016, the entire content of which is incorporated herein by reference.

BACKGROUND OF THE INVENTION

Field of the Invention

The present invention generally relates a table lookup for scalable simulation analysis. An exemplary aspect of this invention is based on efficient deployment of Table Lookup (TLU) methodology in enterprise-level scalable circuit simulation architecture.

Description of the Related Art

In large design groups performing integrated circuit design (digital and/or analog), often the most basic verification for the circuit to be designed is running a circuit simulation, that is a numerical model of the circuit and its excitations (input signals) at conditions specified by the designer (environmental settings). The specifications for the output signal ("output specs") need to be met in order to vet the circuit design for manufacturing and deployment. The most essential and fundamental verification of the circuit design is based on circuit simulation, commonly known within the industry as SPICE (Simulation Program of Integrated Circuit Emphasis).

A circuit simulation job is performed by a computer using extensive numerical techniques and utilizes device models to solve a nonlinear differential algebraic equation solver (also known as transient analysis) to model the input/output relationship of the circuit and to measure the predicted output of the circuit as they are being manufactured. The fundamental cost of computation of circuit simulation is the evaluation of the device models, which is the input/output relationship of the transistor elements. For each transistor (e.g., a field-effect transistor (FET)) there is a set of device parameters (model parameters) and input voltage settings at its ports that evaluate the known quantities of the transistor device (e.g., charges, port currents and their derivatives with respect to the terminal voltages, etc.).

The circuit analysis flow is normally: Circuit Parse>Formulate>Break Down Device Evaluation>MatrixSolve>Iterate Till Converge.

SUMMARY OF THE INVENTION

In the scheme of transient analysis (the main workhorse in integrated circuit design), the device model evaluation is often the most runtime-consuming step, and determines the turn-around-time of the analysis. Indeed, the evaluation of nonlinear devices, such as transistors, accounts for about 50% of the computation or more in many occasions.

In practice, the same circuit and the same devices often get analyzed repeatedly with minor changes in statistical analyses. These analyses include a large number of cases (thousands or more) to be simulated to verify the statistical variations of input/output relationships and the non-deterministic behavior of the circuit under fluctuating model and input parameters.

Device/circuit simulations spend a lot of time in evaluating SPICE equations. As a result, run-time using statistical methodology is very large. Also, such methods consume significant computing resources (load-levelers) and there is no method for a priori load-leveler optimization based on the run time.

In view of the foregoing, and other, exemplary problems, drawbacks, and disadvantages of the conventional systems, it is an exemplary feature of the present invention to provide a system and method in which may improve the runtime/efficiency and save expensive compute time.

It is, therefore, an exemplary feature of the present invention to provide a structure and method for a table lookup for scalable simulation analysis.

A first exemplary aspect of the present invention, to achieve the above features and objects, described herein is a method for conducting numerical analysis. The method includes defining a plurality of components in a system and a condition to be analyzed, performing a table look-up for components of the plurality of components, if a component of the plurality of components is defined in the table, acquiring a result for the condition to be analyzed based on the table information, and conducting the analysis of the system using the result based on the table information for the component.

Another exemplary aspect of the invention is a program, executed on a processor, that includes defining a plurality of components in a system and a condition to be analyzed, performing a table look-up for components of the plurality of components, if a component of the plurality of components is defined in the table, acquiring a result for the condition to be analyzed based on the table information, and conducting the analysis of the system using the result based on the table information for the component.

These features may improve the runtime/efficiency and save expensive compute time.

BRIEF DESCRIPTION OF THE DRAWINGS

The foregoing and other purposes, aspects and advantages will be better understood from the following detailed description of exemplary embodiments of the invention with reference to the drawings, in which:

FIG. 11 illustrates an application of scalable circuit simulation architecture.

DETAILED DESCRIPTION OF AN EXEMPLARY EMBODIMENT(S) OF THE INVENTION

Figure 1:
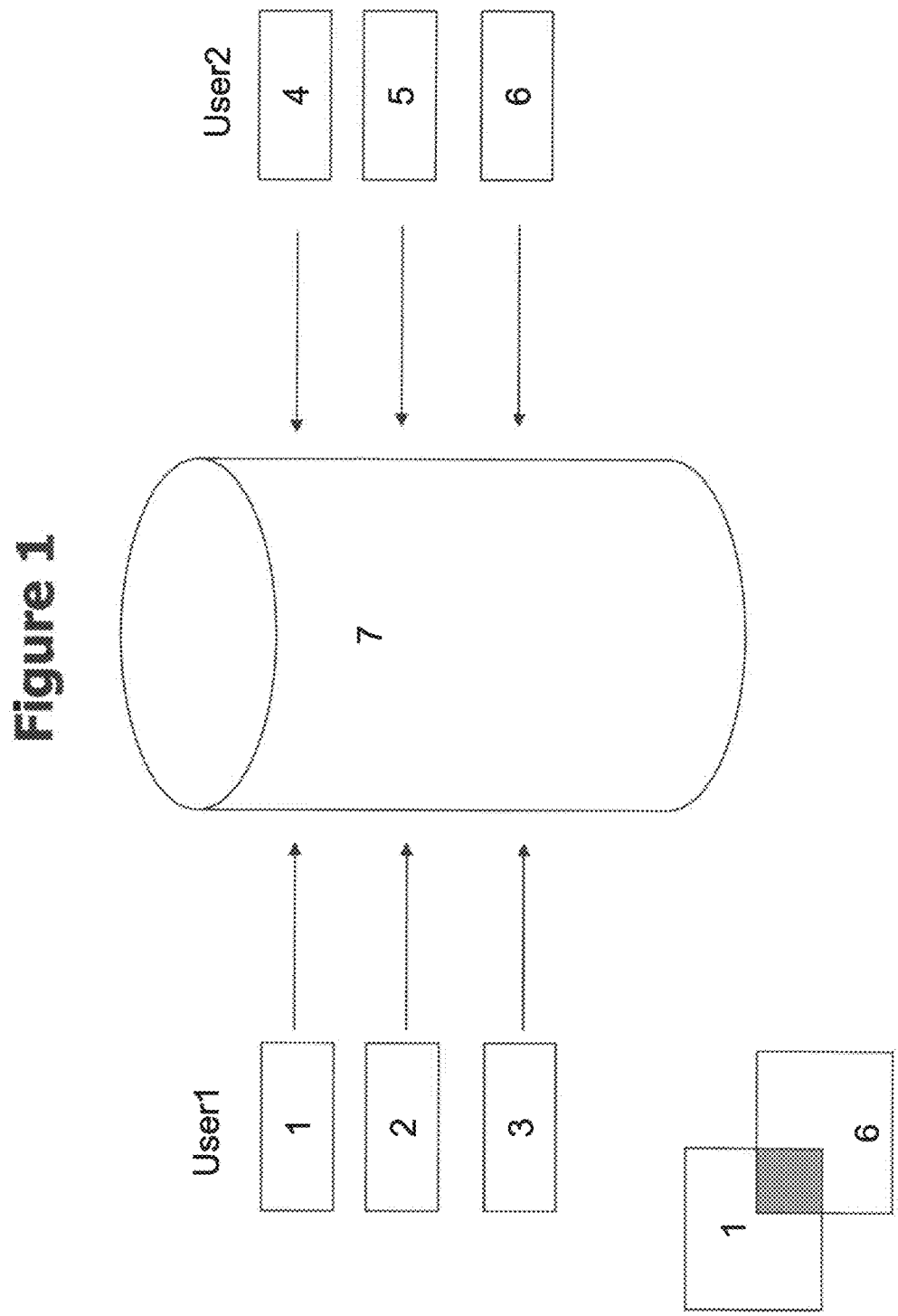
FIG. 1 illustrates an exemplary two-user scenario running a TLU-enabled circuit simulation program on six circuits.

Referring now to the drawings, and more particularly to FIGS. 1-11, there are shown exemplary embodiments of the method and structures according to the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

TLU (table lookup) methodology allows an efficient way to evaluate the device models using a smart cache enabled within the runtime of the simulation. If the simulator requests an evaluation of a device at some settings which had been computed previously, then it could have used a cached result, which constitutes the essence of the TLU methodology.

Hence, what the TLU method does is to copy the evaluated device models into a database (e.g., flat file, database, storage medium, etc.) to be used in subsequent analysis (within the same running setup, or any future run). The TLU method provides the output of the device model evaluation without going through an evaluation script, but by simply making a query to the TLU database. If there is no entry for the evaluation point, then the existing method of device model evaluation can resume. If there is a result to the query of a device model evaluation, then this result could be used inside the analysis. This typically saves a great deal of computation time.

For instance, if a device "NFET" is analyzed at 0.1, 0.2, 0.3 and 0.5 volts (measured across its terminals) in an environment, then the results at each of these voltage inputs for the device in the environment can be stored in the TLU. In the future, if a circuit is analyzed which includes device NFET at in the environment and voltage inputs of 0.2 and 0.5, the results can be looked up in the TLU. Thus, the need to evaluate the device NFET at these voltages can be eliminated and computation time can be saved.

In addition, for example, if the device NFET is to be analyzed at 0.4 volts, that result can be interpolated using the previous results and an interpolation method, such as the SPLINE method [Hazewinkel, Michiel, ed. (2001), "Spline interpolation", Encyclopedia of Mathematics, Springer, ISBN 978-1-55608-010-4], the entirety of which is incorporated herein by reference. Of course, the interpolation can be done using any applicable interpolation technique depending on the data type being modeled such as Multivariate Adaptive Regression Splines (MARS) [Friedman, J. H. (1991). "Multivariate Adaptive Regression Splines". The Annals of Statistics 19: 1.doi:10.1214/aos/1176347963], the entirety of which is incorporated herein by reference, or others.

TLU may be facilitated in a circuit simulation platform through several means. For For example, in any runs made within TLU methodology, each device can be automatically tagged and stored in the TLU database along with its evaluated data tuples. For identifying the device, its name and defining device parameters can be used to create a unique key. This may avoid "collision" or misidentification of two devices with different device parameters/types. The data tuples of terminal voltages, port currents, charges and their derivatives can be stored in the database indexed by the device key. The database can be populated to be used in subsequent runs, by the originating user, or by another user trying to simulate another circuit using the same type of device that shares the same key.

The TLU database is generated by the users contributing the data entries using a TLU-enabled circuit simulator (the database queries along with the numerical calculations of circuit simulation). The TLU database can be generated by multiple users operating in different platforms and geo-locations in an enterprise-level setting. This mode of operation can also reduce the number of full device model evaluations which are very costly and runtime consuming.

The TLU-enabled circuit simulator may also have a data retrieval mechanism in the preparation of the circuit simulation run, to query the useful data retrieved from the central TLU-database and copy them in memory. In this way, the queried data tuples (V, I, Q, derivatives, etc.) are usable in a circuit simulation run without requiring accessing the database during the actual computations. This feature can achieve low latency as compared to when accessing the database when the data tuples are needed during the calculations.

For instance, a list of nonlinear devices with port (terminal) topology and input/output formal definitions can be written as:

NFETxx1, d g s b, Vg Vd Vs Vb Igb Idb Ids, Qd Qg Qs Qd

NFETxx1 (parameters, model, instance, environment)

NFETxx1 (model name, Vt, Ids0, Vtsat, . . . , L, W, Ad, As, . . . , TEMP, NRN)

This FET becomes unique so that any computed output can be safely stored/restored.

KEY stands for an encoded unique key for NFETxx1 (an encryption process for its content, like md5sum). Thus, one can store all (V,I,Q) data-tuples calculated for NFET in a DATABASE indexed by KEY.

The database can be made available for all users within the network to both populate and query. Thus, calculations from various users on various circuits/systems can be captured and shared. This can greatly increase the speed of population of the table and provide a great efficiency in processing for all users.

In an exemplary embodiment, the STORE/RESTORE of the table may happen in the initial phase of the simulator. If KEY doesn't return any results from DATABASE/TLU, it will be computed by the simulator. If KEY does return a result, the simulator can re-use results returned from the DATABASE query.

For instance, a query to the TLU may functionally look like:

GET ALL (V,I,Q) FROM DATABASE WHERE KEY=md5sum(NFETxx1).

FIG. 1 demonstrates an exemplary two-user scenario running a TLU-enabled circuit simulation program on six circuits (circuits 1-6). Here, some common devices (same type, name, parameters) are found among circuits 1 and 6. Thus, if user1 has conducted the analysis, the common devices can be used by user2. As user1 and user2 perform simulations, their collected data tuples are stored in the TLU database 7 and keyed as described above. For this, an md5sum function on the FET name, parameters, etc. can be used to create a unique key for the used device model (e.g., KEY: Md5sum (NFETxx1 (parameters, model, instance, environment)), VALUE: (v, I, Q) tuples). In an exemplary embodiment, entries into the TLU may include NFET1, PFET1, PFET2, etc. In FIG. 1, exemplary circuits 1 and 6 share common devices such as, for example, NFET1, PFETS whose (v, I, Q) evaluations are stored in the TLU database 7.

If another user would re-analyze circuit 1 again, the collected data tuples of the devices in circuit 1 can be queried from the TLU database 7 and translated into the memory of the circuit simulation program. That would eliminate the re-calculation of the device model evaluations performed by the circuit simulator.

Figure 2:
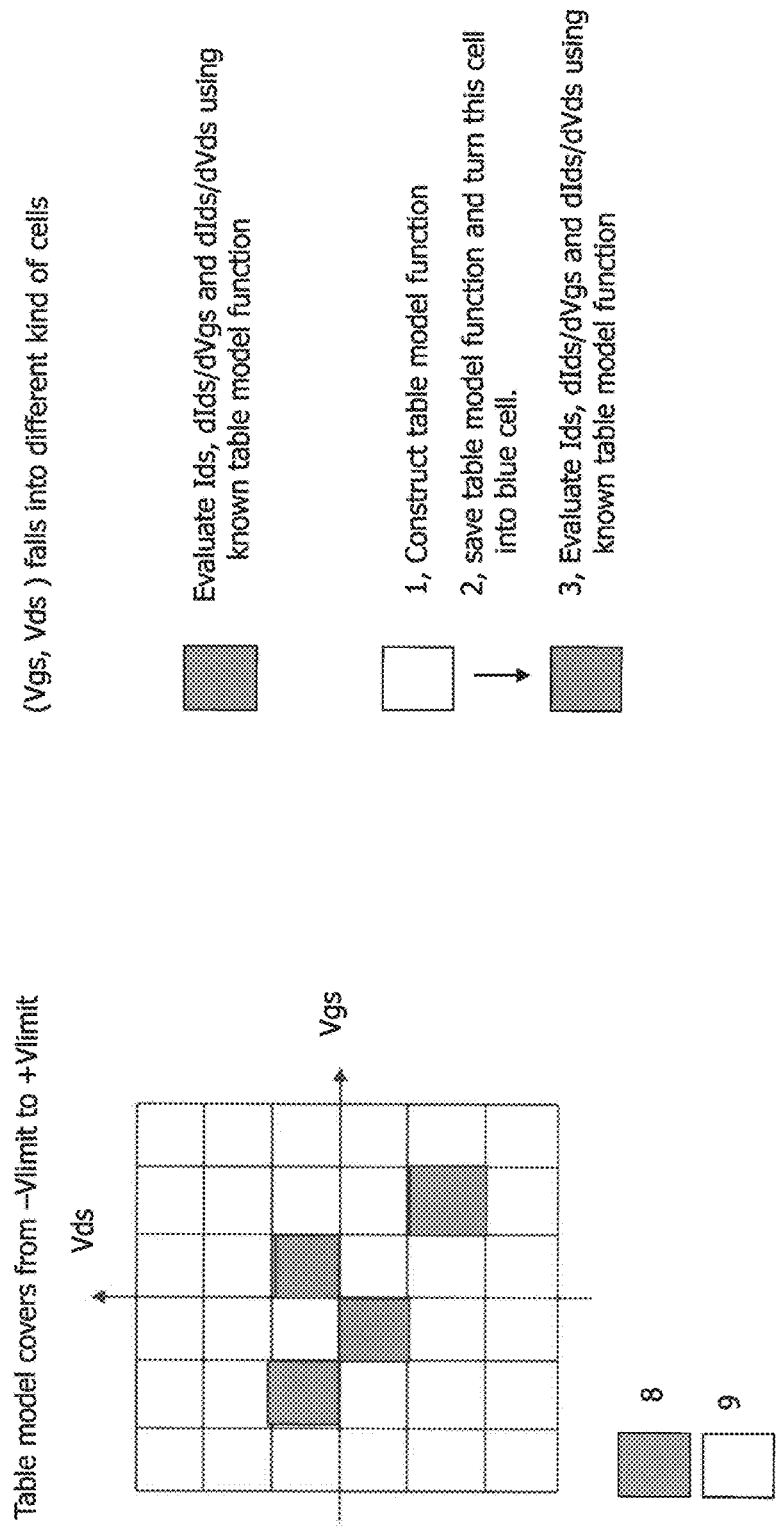
FIG. 2 illustrates grid points of a TLU database.

The TLU database can support sparse data entry, as only the needed data values are being evaluated and stored in the TLU database 7 for subsequent use. FIG. 2 illustrates a 2-dimensional (2D) table model example. In this example, Ids=f(Vgs, Vds), assuming that the grid size is fixed. FIG. 2 shows solid cells 8 in which one can easily calculate the function values for an input point (Vds, Vgs) if it falls into this cell. For instance, solid cells 8 may already have a table modeled evaluation function. All grid points (Vds, Vgs) which are covered by solid cells 8 are evaluated and deployed onto the TLU database 7. For a white cell 9 (e.g., a cell which needs to create a table model function), some or all of its grid point values are not available in the TLU database 7, during a simulation, if an arbitrary point (Vds, Vgs) falls into a white cell 9, all of its grid points values needs to be obtained either from the TLU 7 if available or from evaluation if not available, then an interpolation scheme can be used to calculate the value of the input point based on the values of the grid points. Once this is done, the white cell 9 becomes a solid cell 8 since all of its grid point information will be saved in the TLU 7 and available for possible subsequent use.

The TLU methodology allows forming a grid setting, as some data grid points can be selected to store/restore data values. That is, for example, the voltage inputs should be rounded to a grid base to enable scalability in the database. Hence, a resolution parameter (dV) is used to create grid points of the input parameters to key the voltage inputs. For instance, voltage may be rounded to tenths of a volt 1.0V, 1.1V, 1.2V, etc. In an exemplary embodiment, the grid range is bigger than the possible working voltage range of the device.

Figure 3:
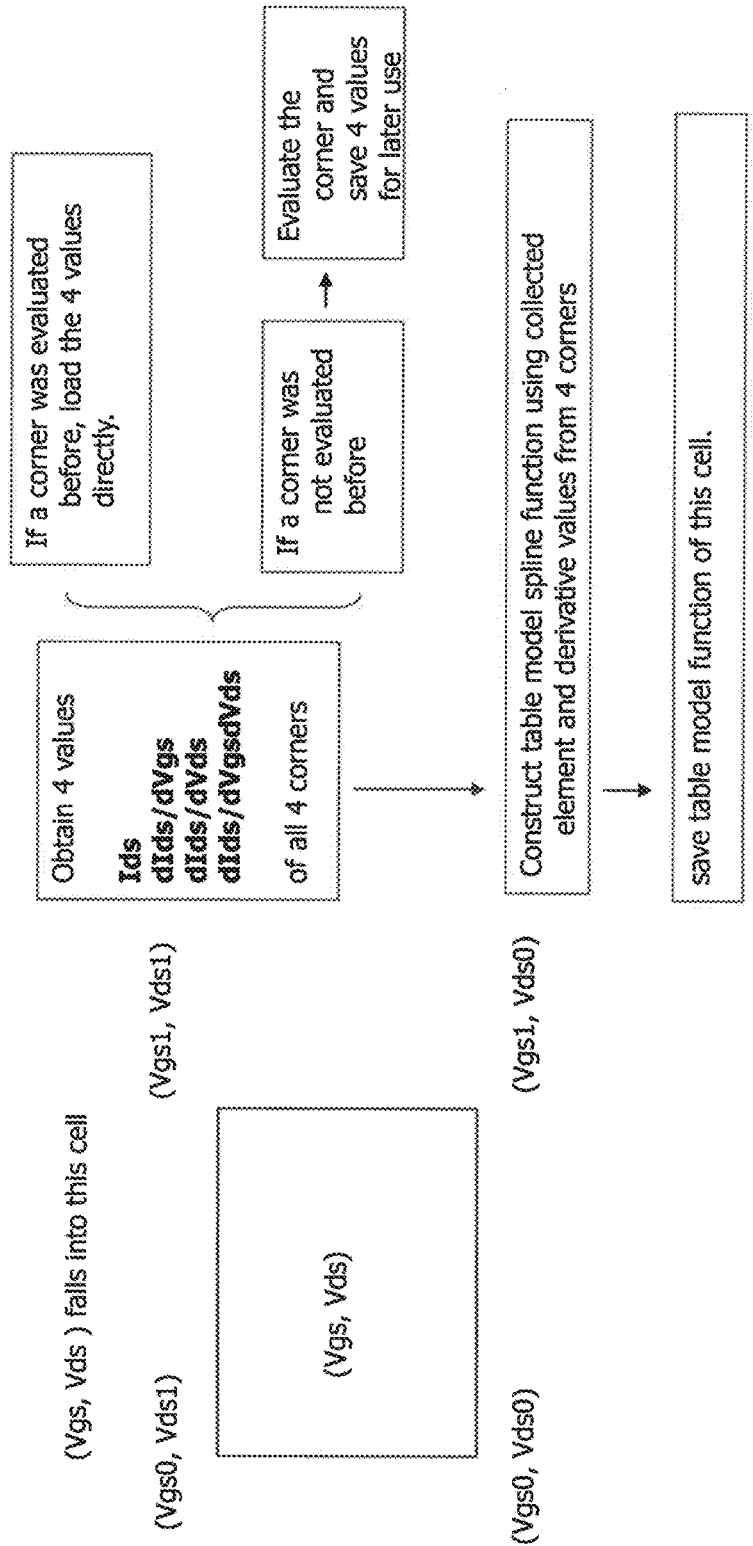
FIG. 3 illustrates an exemplary method of interpolating missing values for a device.

FIG. 3 illustrates an exemplary method of interpolating missing values for a device using a 2D table model where Ids=f(Vgs, Vds) spline table model function. For instance, the value to be analyzed Vgs and Vds falls within a cell. It is then determined if the four values of the cell are present and can be used. If not, then the missing value is interpolated with the SPLINE interpolation method. The table model function of this cell can then be saved. Using a 3rd 2D Hermite spline function as example, once we know Ids, dIds/dVgs, dIds/dVds values at the 4-grid point of a cell, we can construct a $3^{rd}$ order polynomial function of Vgs and Vds to calculate Ids value for any point (Vds, Vgs) in the cell.

Figure 4:
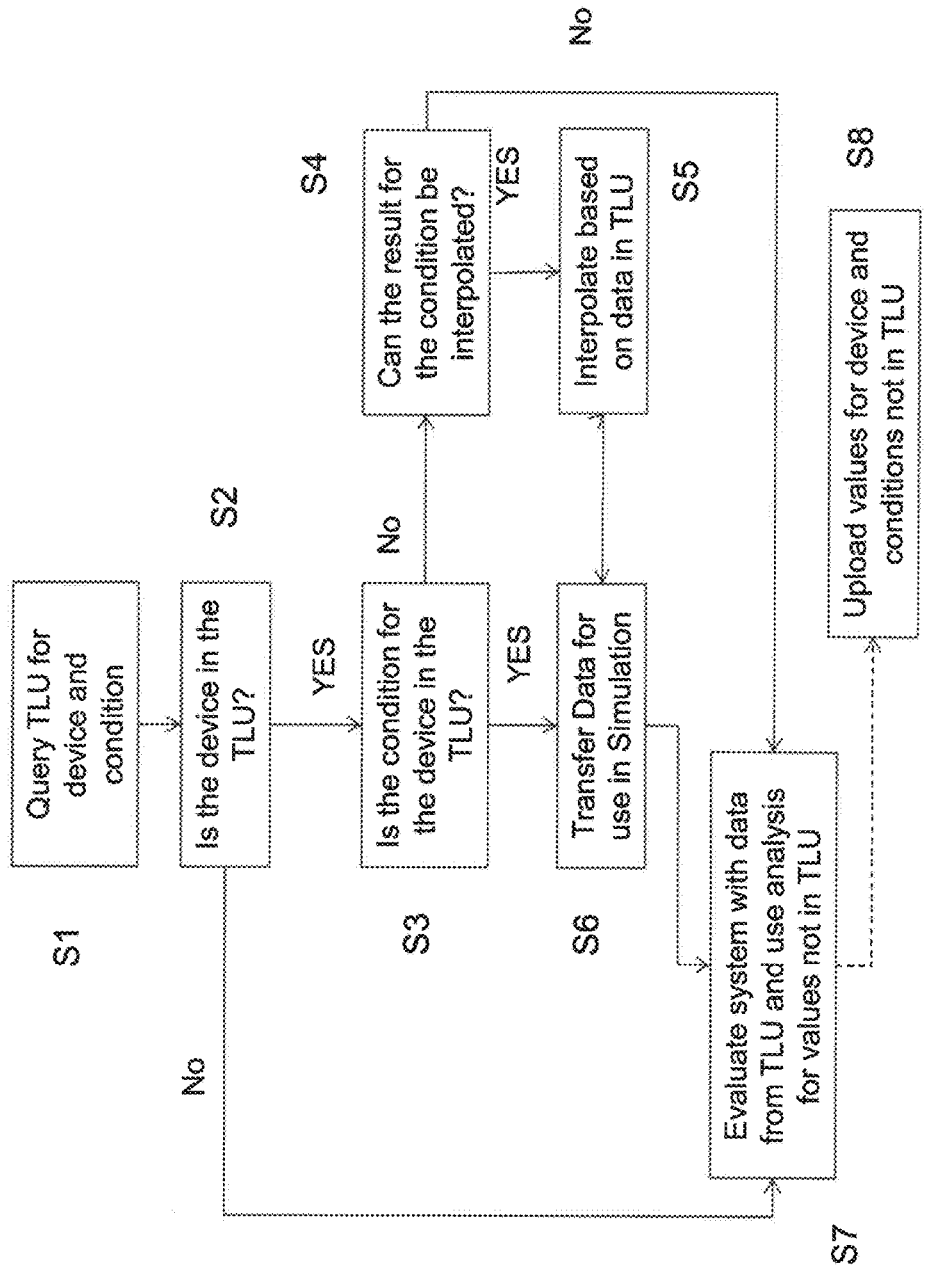
FIG. 4 illustrates an exemplar method of implementing TLU with a simulation program.
Figures 5, 6:
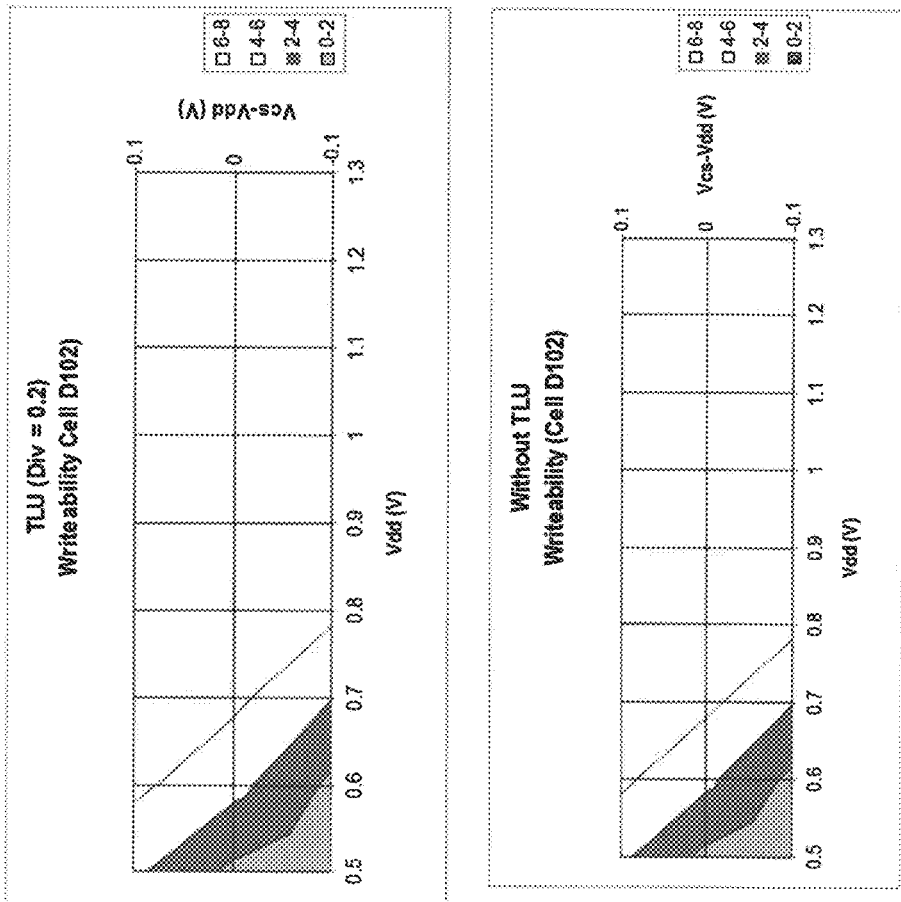
FIG. 5 illustrates write-ability results with the TLU methodology.
FIG. 6 illustrates write-ability results without the TLU methodology.
Figures 7, 8:
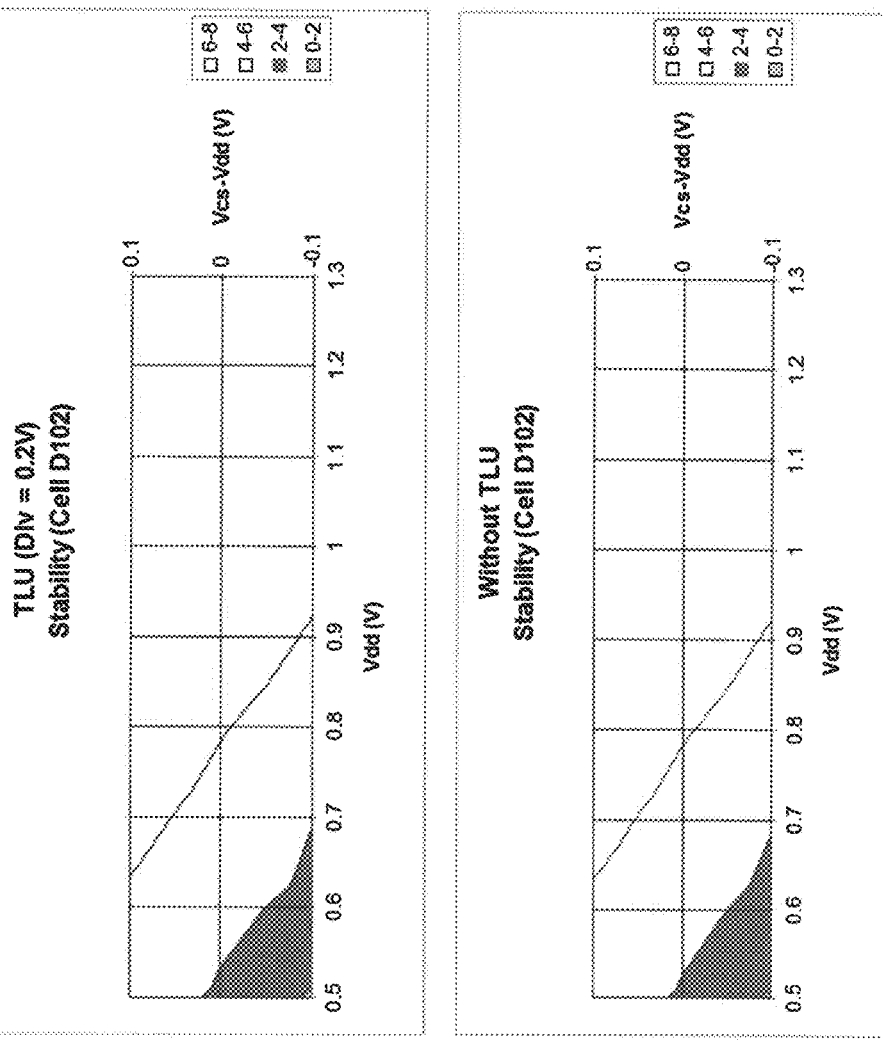
FIG. 7 illustrates stability results with the TLU methodology.
FIG. 8 illustrates stability results without the TLU methodology.

An exemplary method of implementing TLU with a simulation program can be seen in FIG. 4. Once a system and conditions to be simulated have been determined, the TLU database can be queried for the device and conditions to be analyzed (S1). If the TLU contains the queried device and condition (S2 and S3), then the results are transferred for use in the simulation program (S6). Optionally, if the TLU contains the device but not the specific condition being queried, it is determined if the condition can be interpolated from the conditions stored in the TLU (S2 and S4). If it is possible to interpolate the condition for the device, then the interpolated results are interpolated (S5) and transferred for use in the simulation program (S6). If the device is not found in the TLU, or if the condition cannot be interpolated, then the simulation program will conduct the analysis for that device when the analysis is performed (S7). Optionally, once the simulation program has finished analyzing the device, it can upload the device and conditions not found in TLU to the TLU (S8).

The TLU methodology can be applied, for example, to a statistical circuit simulation program that runs thousands of circuit simulations of a particular circuit structure on various parameter settings. This is a heavy user of circuit simulation program calculating performance statistics, manufacturability yield and design sensitivities. By using the TLU methodology described above, the same quality result can be achieved with a lower runtime and wall-time. Thus, using the TLU methodology allows gains in analysis turn-around time.

FIGS. 5-8 illustrate that the design sensitivities (shown as the sigma for the probability of failure) captured are the same with and without the TLU methodology. In particular, there was practically no difference in write-ability for D102 cell with TLU and without TLU and practically no difference in stability for D102 cell with TLU and without TLU. This validates the accuracy of the TLU methodology that used statistical circuit simulation program.

Figure 9:
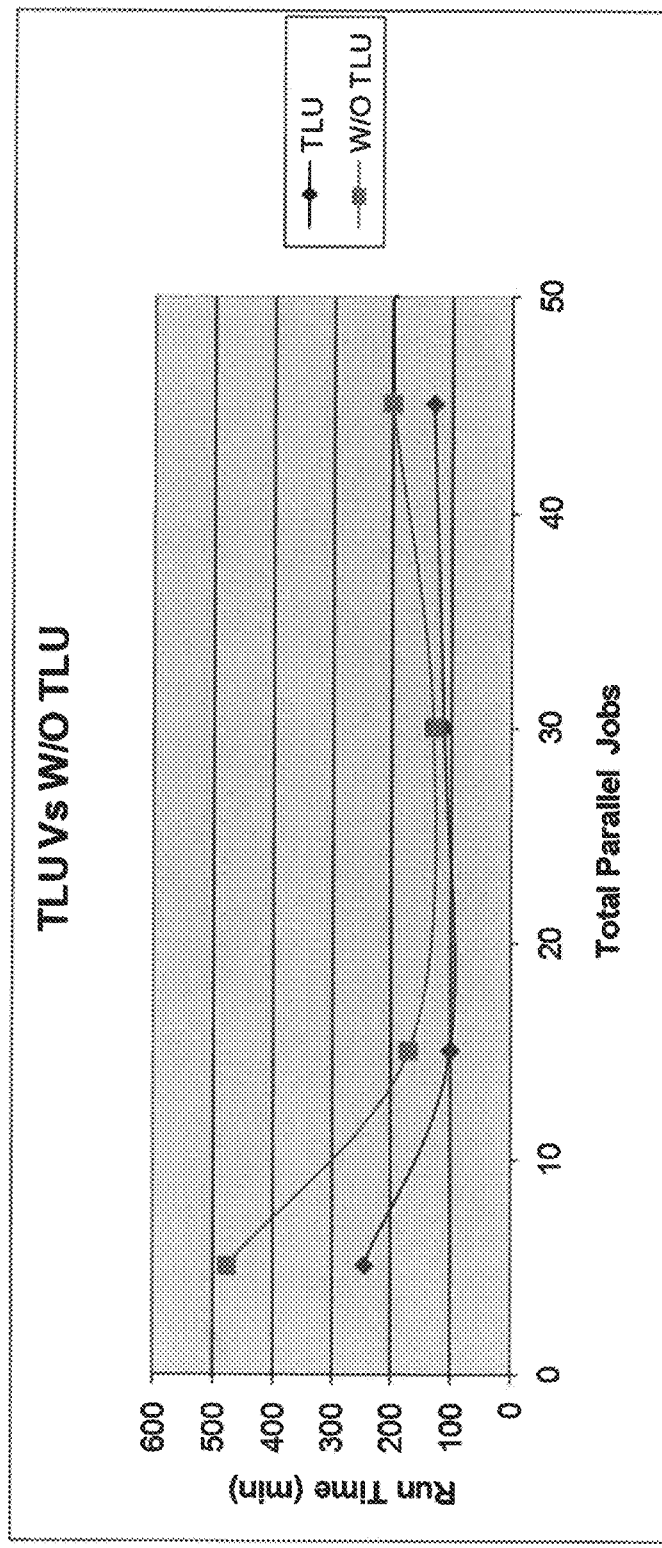
FIG. 9 illustrates an example of run-time versus parallel jobs with and without TLU.
Figure 10:
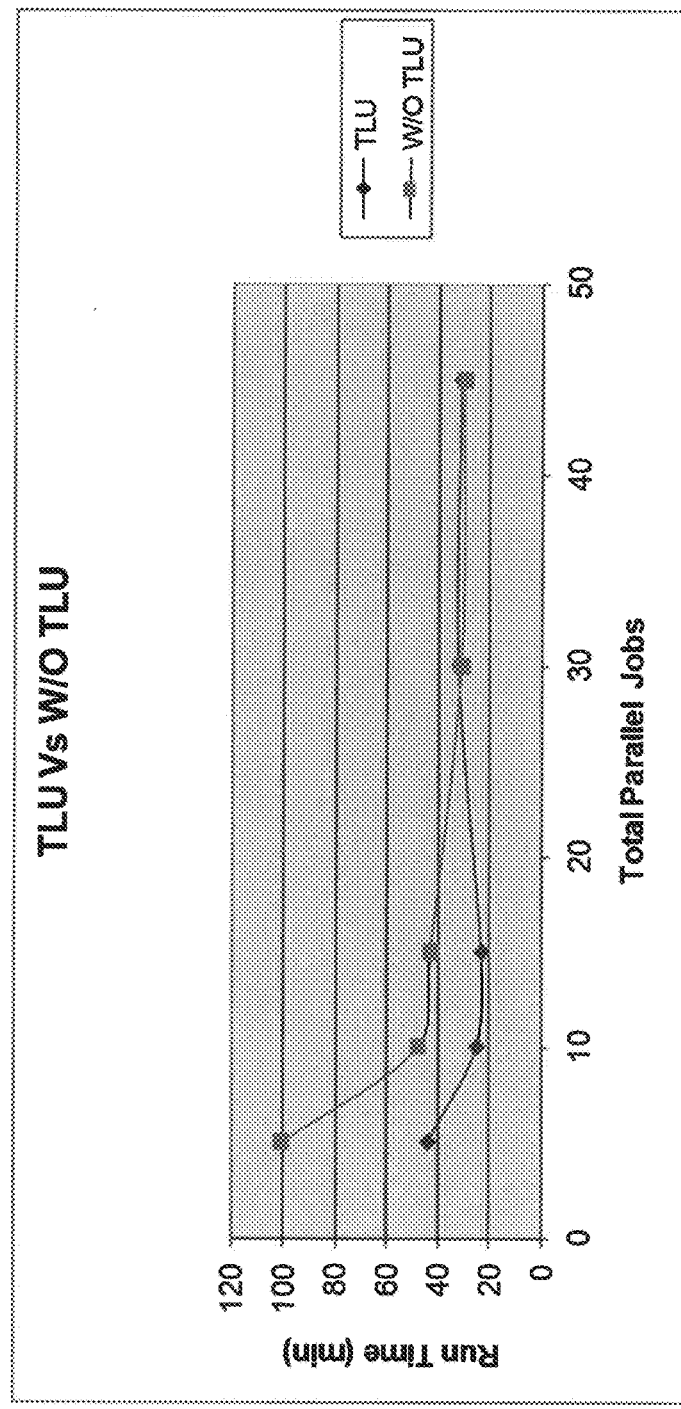
FIG. 10 illustrates another example of run-time versus parallel jobs with and without TLU.

As shown in FIGS. 9 and 10, the same quality results have been achieved by a shorter runtime/walltime. FIGS. 9 and 10 show the run time impact with and without TLU in the presence of the total number of parallel jobs. The TLU enabled simulations took much less runtime at various running options (resources used as parallel jobs).

For example, FIG. 9 illustrates results using five hundred and ninety five elements with and without TLU. FIG. 9 shows that the process with TLU is 1.8× to 2× times as fast as the process without TLU. As can be seen, the TLU process saves resource allocation by up to two times while improving the run time performance.

In FIG. 10 processes with and without TLU was again applied to a system of 595 elements. In this example, the TLU process was 2× to 2.3× times as fast as without TLU. As can be seen, the TLU process saved resource allocation by two times which improving the run time performance.

Further, FIG. 11 illustrates an application of scalable circuit simulation architecture. In FIG. 11, an illustration of a design analysis program 10 is used on a large integrated circuit design to simulate and analyze circuit behavior. This electronic design automation (EDA) program 10 takes the entire integrated circuit data 11 and passes it to a circuit partitioner 12 which breaks down the big circuit 11 into smaller circuits 13 based on connectivity and independence rules. The small circuits 13 are analyzed via a TLU enabled circuit simulator 14 with the help of a TLU database 17 that contains KEY/VALUE pairs as described above. The use of the TLU database 17 saves a significant amount of runtime, as it enables the TLU-enabled circuit simulator 14 to store and restore commonly used device model data which is crucial in circuit simulation runtime. In an exemplary embodiment the TLU database 17 access can occur in prologue/epilogue of the simulation. It could also provide key insight on device model analytics as it would identify the general uses of such device models, as it can facilitate device model to hardware correlation 15 for model enhancements. The TLU-enabled circuit simulator 14 can perform simulations/analyses effectively and can pass the results (optionally through a data harvester 16) to a reporting stage 18 to be used by the EDA application user who seeks out critical performance data for the integrated circuits under analysis. These results can also be used to optimize the EDA application run 19.

While the above exemplary embodiments focus on specific uses, such as circuit simulation, the TLU method can be very broadly used in device, circuit, and CAD groups. Indeed, the TLU method can be used in any simulation program which analyzes multiple subsystems/components. For instance, the TLU method can also be used in computations of complex systems such as weather models where the components can be any one of wind, heat, current, etc. The architecture is scalable and enables multi-users to jointly take advantage of TLU-based simulation. This technology can extend predictive analytics and provide software driven run optimization for predictive analytics. The facilitation of utilizing a TLU database and its enabled circuit simulator counterparty allows scalable, large-scale analysis on a more manageable compute farms as it provides predictive capabilities and metering statistics produced on the fly.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method for conducting numerical analysis, the method comprising:
    defining a plurality of components in a system and a condition to be statistically analyzed;
    performing a table look-up in a table for individual components of the plurality of components;
    acquiring a result for the condition to be statistically analyzed based on information in the table when a component of the plurality of components is defined in the table;
    designing a circuit from integrated circuits based on conducting the statistical analysis of the system, wherein the designing the circuit from the integrated circuits is implemented in manufacturing the integrated circuits; and
    determining if the condition to be statistically analyzed is possible to be interpolated from existing conditions for the component in the table,
    wherein, when the determining determines that the condition to be statistically analyzed is possible to be interpolated from the existing conditions, the method further comprises interpolating the existing conditions for the component in the table to obtain the condition to be statistically analyzed.

2. The method according to claim 1, wherein the component defined in the table includes a result corresponding to the condition to be statistically analyzed.

3. The method according to claim 1, further comprising interpolating the result based on other conditions, different from the condition, for the component in the table.

4. The method according to claim 1, further comprising uploading components of the plurality of components and results of the components to the table.

5. The method according to claim 1, wherein the component defined in the table is stored in the table and is identified by a unique tuple.

6. The method according to claim 1, wherein the table is simultaneously sharable among users.

7. The method according to claim 1, wherein the system comprises the circuit and the component comprises a transistor.

8. The method according to claim 7, wherein the condition includes an input voltage.

9. The method according to claim 1, further comprising rounding the condition prior to performing the table look-up based on a scale of the table.

10. The method according to claim 1, wherein, when the determining determines that the condition to be statistically analyzed is impossible to be interpolated from the existing conditions, the method further comprises conducting a simulation to perform an analysis for the system to design the circuit.

11. A non-transitory computer readable storage medium tangibly embodying a program of machine-readable instructions executable by a digital processing apparatus to perform a method, the method comprising:
    defining a plurality of components in a system and a condition to be statistically analyzed;
    performing a table look-up in a table for individual components of the plurality of components;
    acquiring a result for the condition to be statistically analyzed based on information in the table when a component of the plurality of components is defined in the table;
    designing a circuit from integrated circuits based on conducting the statistical analysis of the system, wherein the designing the circuit from the integrated circuits is implemented in manufacturing the integrated circuits; and
    determining if the condition to be statistically analyzed is possible to be interpolated from existing conditions for the component in the table,
    wherein, when the determining determines that the condition to be statistically analyzed is possible to be interpolated from the existing conditions, the method further comprises interpolating the existing conditions for the component in the table to obtain the condition to be statistically analyzed.

12. The non-transitory computer readable storage medium according to claim 11, wherein the component defined in the table includes a result corresponding to the condition to be statistically analyzed.

13. The non-transitory computer readable storage medium according to claim 11, further comprising interpolating the result based on other conditions, different from the condition, for the component in the table.

14. The non-transitory computer readable storage medium according to claim 11, further comprising uploading components of the plurality of components and results of the components to the table.

15. The non-transitory computer readable storage medium according to claim 11, wherein the component stored in the table is identified by a unique tuple.

16. The non-transitory computer readable storage medium according to claim 11, wherein the table is simultaneously sharable among users.

17. The non-transitory computer readable storage medium according to claim 11, wherein the system comprises a circuit and the component comprises a transistor.

18. The non-transitory computer readable storage medium according to claim 11, wherein the condition includes an input voltage, and
    wherein the system comprises a weather model and the component comprises one of wind, heat, and current.

19. The non-transitory computer readable storage medium according to claim 11, wherein the method further comprises rounding the condition prior to performing the table look-up based on a scale of the table.

20. The non-transitory computer readable storage medium according to claim 11, wherein, when the determining determines that the condition to be statistically analyzed is impossible to be interpolated from the existing conditions, the method further comprises conducting a simulation to perform an analysis for the system to design the circuit.

* * * * *